May 26, 1964 R. R. HANSON 3,134,450
WEIGHING DEVICES
Filed June 15, 1962 3 Sheets-Sheet 1

INVENTOR.
ROY R. HANSON
BY Alfred W. Petchaft
ATTORNEY

May 26, 1964 R. R. HANSON 3,134,450
WEIGHING DEVICES

Filed June 15, 1962 3 Sheets-Sheet 2

INVENTOR.
ROY R. HANSON
BY *Alfred W Petchaft*
ATTORNEY

May 26, 1964

R. R. HANSON 3,134,450

WEIGHING DEVICES

Filed June 15, 1962

INVENTOR.
ROY R. HANSON
BY *Alfred W Petchaft*
ATTORNEY

United States Patent Office 3,134,450
Patented May 26, 1964

3,134,450
WEIGHING DEVICES
Roy R. Hanson, 155 Cumberland Drive, Maryland Heights, Mo., assignor of one-fourth to William H. Anderson, Glencoe, Mo., and one-fourth to Joseph H. Schierman, and one-fourth to George A. Blase, both of St. Louis, Mo.
Filed June 15, 1962, Ser. No. 202,861
16 Claims. (Cl. 177—116)

This invention relates in general to weighing devices and, more particularly, to an improved type of balance for accurately weighing small amounts of fine grain powders.

Today it is a common practice for many rifle and hand gun enthusiasts to load their own shells and cartridges. This loading of firearm cartridges entails the accurate and consistent measurement of the amount of gun powder used in each cartridge. In cartridges which are to be used in the so-called "bench-rest" firearm, the amount of gun powder to be loaded in each cartridge must be very accurately measured, in order to obtain consistent results on the firing range. A slight variance in the amount of gun powder will cause serious inaccuracies in range. Therefore, the firearm enthusiast devotes great effort to obtaining a high degree of precision in the amount of gun powder to be loaded in each cartridge.

Heretofore, these weight measurements were carried out by either of two methods. The first method consists of a volumetric determination in which the gun powder was poured into a graduated flask or cylinder to a desired volume and then loaded in the firearm cartridge. Obviously, this method is not highly precise and the weight of gun powder will vary considerably due to humidity and other ambient conditions at the time of loading.

The second method of measuring the amount of gun powder to be placed in a cartridge is by weighing. The types of weighing devices used range from a rather crude scale to an elaborate pair of scales of the so-called "analytical balance" type, depending upon the requirements of the cartridge loader and his financial resources. If the pair of scales or balance is not provided with some type of magnetic or hydraulic damper, the user must spend a good deal of time in the weighing procedure while the balance arm swings back and forth until it finally comes to rest after each additional increment of powder is added to the weight pan.

It is, therefore, the primary object of the present invention to provide a weighing device which will accurately weigh out a predetermined amount of gun powder to be used in a firearm cartridge.

It is another object of the present invention to provide a weighing device of the type stated which will automatically accept a predetermined amount of gun powder, responsive to a predetermined weight setting on the weighing device.

It is a further object of the present invention to provide a weighing device of the type stated which is capable of rapid operation for quickly and accurately obtaining a desired weight of gun powder.

It is an additional object of the present invention to provide a weighing device of the type stated which is relatively simple in operation, sturdy in construction, and inexpensive to manufacture.

With the above and other objects in view, my invention resides in the novel features of form, construction, arrangement, and combination of parts presently described and pointed out in the claims.

In the accompanying drawings (three sheets)—

Figure 2:
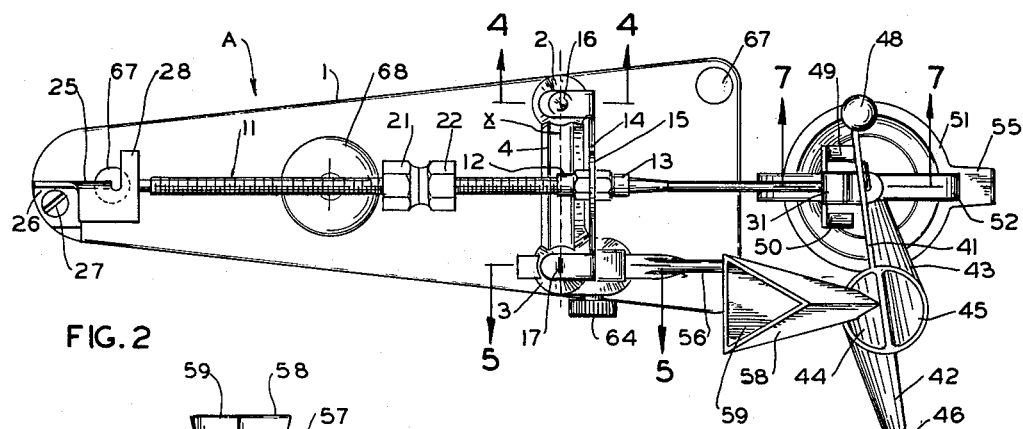
FIG. 2 is a top plan view of the weighing device constructed in accordance with and embodying the present invention.
Figure 4:
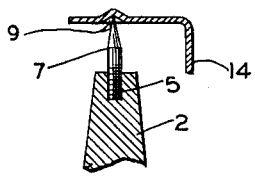
Figure 5:
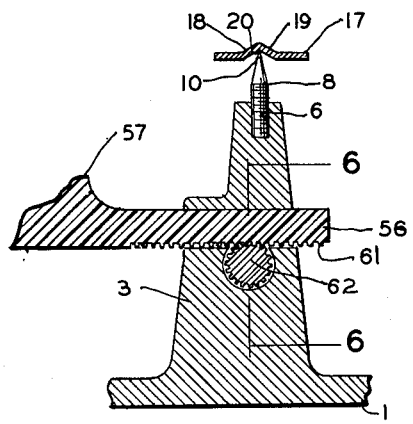

FIGS. 4 and 5 are fragmentary sectional views taken along lines 4—4 and 5—5, respectively, of FIG. 2.

Figure 6:
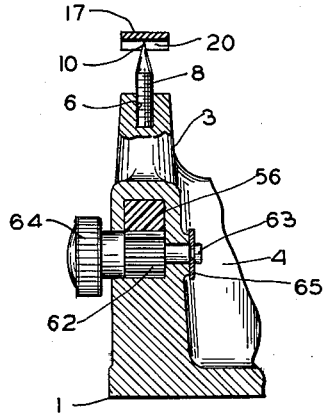
Figure 7:
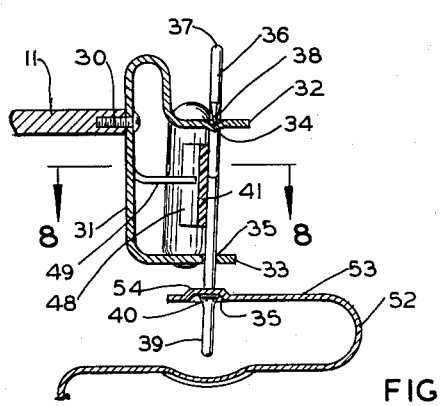
Figure 8:
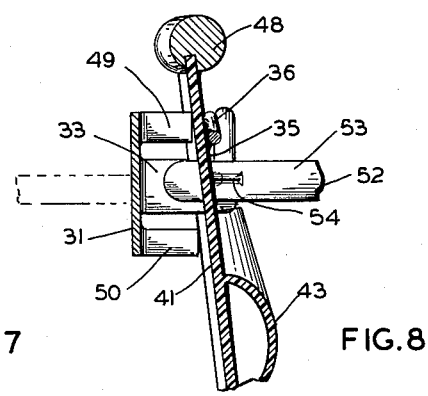
Figure 9:
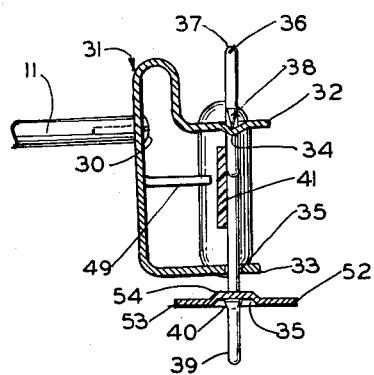
Figure 10:
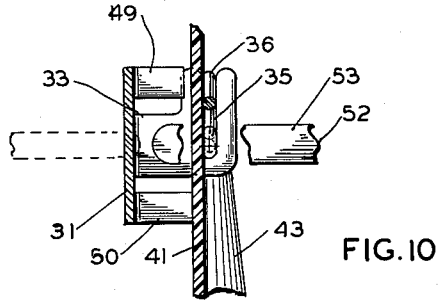
Figure 11:
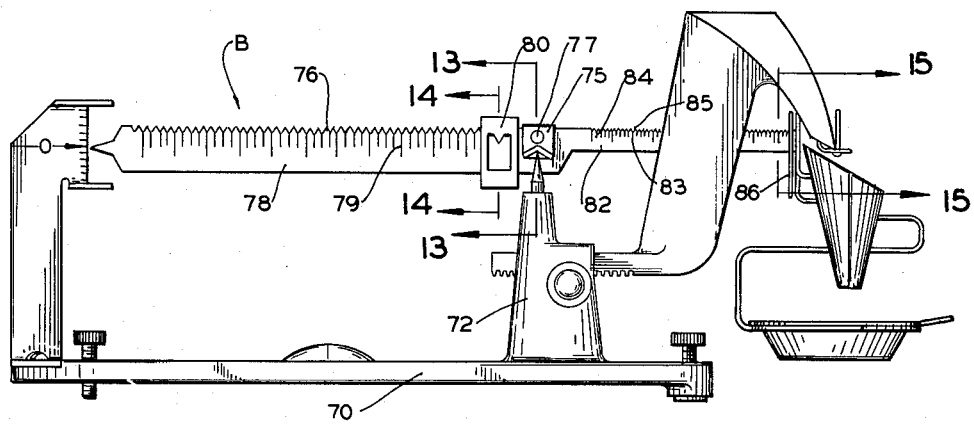
Figure 12:
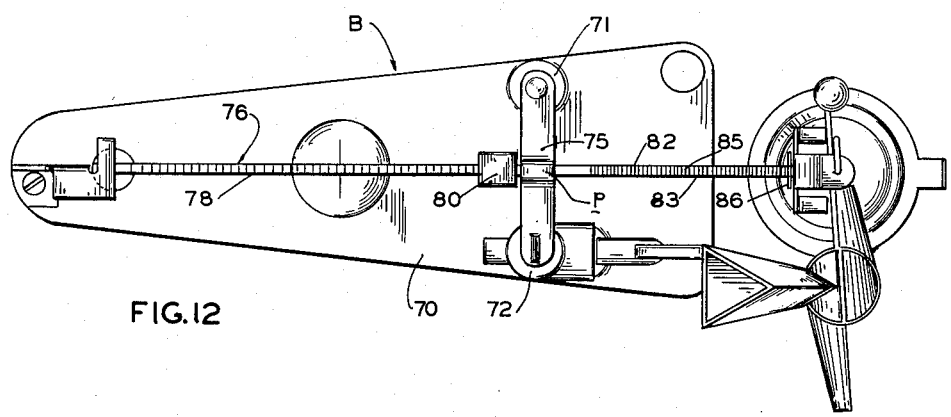
Figure 13:
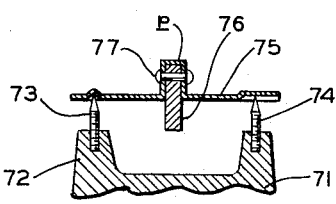
Figure 14:
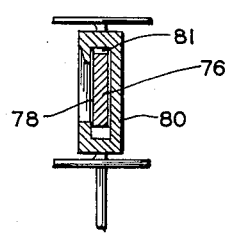
Figure 15:
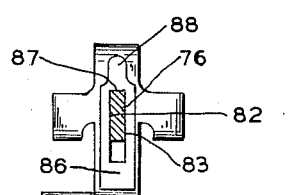

FIG. 6 is a fragmentary sectional view taken along line 6—6 of FIG. 5;

FIG. 7 is a fragmentary sectional view taken along line 7—7 of FIG. 2;

FIG. 8 is a fragmentary sectional view taken along line 8—8 of FIG. 7;

FIGS. 9 and 10 are sectional views similar to FIGS. 7 and 8, respectively, showing the pivot pin forming part of the present invention in the unactuated position;

FIG. 11 is a side elevational view of a modified form of the weighing device constructed in accordance with and embodying the present invention;

FIG. 12 is a top plan view of the modified form of the weighing device constructed in accordance with and embodying the present invention; and FIGS. 13, 14, and 15 are fragmentary sectional views taken along lines 13—13, 14—14, and 15—15, respectively of FIG. 11.

Referring now in more detail and by reference characters to the drawings which illustrate practical embodiments of the present invention, A designates a weighing device comprising a somewhat triangular cast aluminum base 1, integrally formed with a pair of spaced parallel uprights 2, 3, which are connected by a relatively thin transversely extending web 4.

The uprights 2, 3, are internally drilled from their top faces and tapped to provide internally threaded bores 5, 6, for accommodating externally threaded fulcrum pins 7, 8, which are preferably formed of a relatively hard, high-carbon steel, and are provided at their upper ends with tapered pivot points 9, 10, respectively.

Rockably supported by the fulcrum pins 7, 8, is a balancing arm 11 which is externally threaded along the greater portion of its length. Rigidly secured to the arm 11 and extending laterally thereacross by means of a pair of locking nuts 12, 13, is a fulcrum-arm 14 which integrally includes a relatively flat bearing plate 15 which extends outwardly in a horizontal direction on either side of the arm 11. The bearing plate 15 is suitably provided at one end with a pivot recess 16 for accommodating the pivot point 9 and at the other end with an inverted V-shaped bearing plate 17 having a pair of upwardly converging legs 18, 19, which form an elongated pivot groove 20 at their apex, for accommodating the pivot point 10, thereby establishing a fulcrum axis x. By means of this construction, it can be seen that the fulcrum pin 8 bearing in the pivot recess 16 prevents transverse shifting of the balancing arm 11 and the fulcrum pin 7 bearing against the pivot groove 20 prevents longitudinal shifting of the balancing arm 11 during its rocking movement. It should also be understood that the pivot pins could be mounted on the fulcrum arm 14 and bear against recesses formed within the uprights 2, 3. For certain types of balances, this latter construction is preferred, and it is only a simple matter to convert the balancing mechanism illustrated to the balancing mechanism where the pivot pins are mounted upon the fulcrum arm 14.

Threadedly mounted on the balancing arm 11 are a pair of longitudinally shiftable weights 21, 22, which can be shifted to any desired position on the threaded portion of the balancing arm 11 for maintaining a desired weight thereon. The balancing arm 11 is tapered at its forward end to form an indicating needle 23 which is adjacent and swings in reference to a graduated indexing scale 24 imprinted upon the flat surface of an upstanding support arm 25, the latter having an outwardly extending bottom flange 26 which is rigidly secured to the base 1 adjacent its forward margin, by means of bolts 27. The support arm 25 is integrally formed with a pair of laterally extending spaced parallel abutment plates 28, 29, which serve as stops to limit the rocking movement of the balancing arm 11. The graduated scale 24 preferably includes a zero line and a plurality of one-tenth grain deviation lines.

Figure 3:
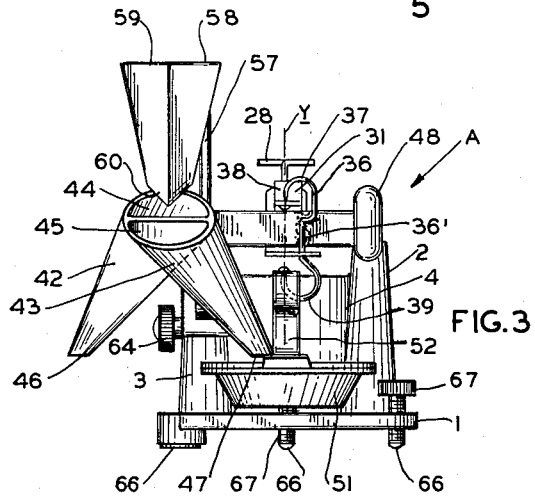
FIG. 3 is an end elevational view of the weighing device constructed in accordance with and embodying the present invention.

The portion of the balancing arm 11 extending to the right of the fulcrum arm 14 (reference being made to FIG. 1), is slightly diametrically reduced in order to remove excess weight and provide a more sensitive balance on the fulcrum pins 7, 8. Rigidly secured to the right transverse end of the balancing arm 11, reference being made to FIG. 1, by means of a bolt 30 is a vertical support bracket 31 having upper and lower rearwardly extending parallel flanges 32, 33. The flange 32 is provided with a pivot recess 34 and the flange 33 is provided with an elongated laterally extending guide slot 35. A pivot pin 36, having a straight shank 36', integrally includes an upper U-shaped arcuate bend 37 which terminates in a depending pivot point 38 and is supported in the pivot recess 34. The pivot pin 36 is movable within the laterally extending guide slot 35 and is integrally formed with a lower U-shaped arcuate bend 39 terminating in a relatively sharp chisel point 40, the latter of which is spaced downwardly from the flange 33 and the elongated slot 35. By reference to FIG. 3, it can be seen that the pivot point 38 and the chisel point 40 form a vertical pivot axis $y$ which is spaced from the shank 36' of the pivot pin 36.

Rigidly secured to the shank 36' by means of a suitable adhesive is a transversely extending cross-bar 41 preferably formed of plastic or other suitable synthetic resin material. Integrally formed with the cross-bar 41 are a pair of diverging downwardly extending funnels 42, 43, which may, for convenience, be referred to as a diverting funnel 42 and a delivery funnel 43. The funnels 42, 43, are both open at their upper ends in the provision of intake apertures 44, 45, respectively, which are on opposite sides of and are separated by the cross-bar 41. By reference to FIG. 2, it can be seen that funnels 42, 43, are downwardly tapering and open at their lower ends in the provision of relatively small discharge apertures 46, 47. By further reference to FIG. 2, it can be seen that the funnel 43 is spaced rearwardly of the funnel 42 and that each will pivot with the cross-bar 41 as the pivot pin 36 pivots in the pivot recess 34. The cross-bar 41 is provided at its other end with a counterweight 48 to offset the weight of the funnels 42, 43. In order to regulate the amount of pivot of the pin 36, the vertical support bracket 31 is integrally provided with a pair of rearwardly extending stop arms 49, 50, the former of which extends rearwardly for a slightly greater distance than the latter. By means of this construction, it can be seen that the pivot pin 36 will pivot in an arc, the length of which is regulated by the two arms 49, 50.

Provided for pivotal securement to the chisel point 40 is a powder dish or scale-pan 51 integrally including an S-shaped support arm 52 having an upper horizontal leg 53, the latter of which is provided on its underface with a groove 54 which is sized to accommodate the chisel point 40. Thus, it can be seen that the powder dish 51 is supported by and stationary with respect to the pin 36 as the chisel point 40 will fit snugly within the groove 54 but that the dish 51 will pivot with the pin 36. The dish 51 can be provided with an outwardly extending tab or handle 55 if desired. The dish 51 and the counterweight 48 are weighed so that the balance arm 11 will be aligned with the zero line of the graduated zeroing scale 24 when the weights 21, 22, are moved to the rearward end of the arm 11 and abut the locking nut 12.

The upright 3 is longitudinally bored to slidably accommodate a horizontally shiftable bar 56 which is integrally formed with an upwardly extending arcuate portion 57 and secured thereto is a hopper 58 having a somewhat triangular horizontal cross-section. By reference to FIG. 2, it can be seen that the hopper 58 has a relatively large intake aperture 59 and tapers downwardly to a relatively small discharge aperture 60, the latter being disposed over the intake aperture 44 of the funnel 42 when the cross-bar 41 is in the position as shown in FIG. 2. However, when the balancing arm 11 is weighted and the pivot pin 36 is pivoted to its other end position, the discharge aperture 60 will be disposed immediately above the intake aperture 45 of the funnel 43.

The wide variety of gun powders which can be used in the weighing device A often vary considerably in particle size and density. Moreover, the shape of the gun powder particles often varies. It is, therefore, desirable to regulate the actual position of the hopper 58 over each of the intake apertures 44, 45. Accordingly, the horizontally shiftable bar 56 is provided with a rack segment 61 which is adapted to mesh with a pinion gear 62. The pinion gear 62 is mounted on and rotatable with a control rod 63, the latter of which is rotatably mounted in and extends through the upright 3 and terminates in a control handle or knob 64. The rod 63 is maintained within the upright 3 by means of a lock ring 65. Thus, if the knob 64 is rotated, thereby rotating the pinion gear 62, this will, in turn, move the rack segment 61 which is formed with the horizontally shiftable bar 56. Thus, the arcuate portion 57 and hopper 58 will move forwardly or rearwardly. If desired, the knob 64 can be provided with a graduated scale, the degrees of which are proportional to the movement of the shiftable bar 56, and the upright 3 provided with an indicia marker or arrow.

The base 1 is integrally formed with three depending feet 66 which are located on the apices of a triangle. It is, of course, desirable to adjust the base 1 to a level position and, accordingly, the base 1 is provided with a pair of oppositely disposed adjustable elevation screws 67. A level indicator 68 is mounted within a recess 69 formed within the base 1 to indicate when the base 1 is correctly leveled. As the adjustable screws 67 and the level indicator 68 are conventional in construction, they are neither illustrated nor described in detail herein.

In use, the weighing device A can be conveniently placed on any suitable support (not shown) and leveled by means of the adjustable screws 67 until the base 1 appears level according to the level indicator 68. In order to maintain a predetermined weight setting on the balancing arm 11, a weight or weights of known quantity may be placed in the powder dish 51 and the balance weights 21, 22 moved along the arm 11 until the balancing arm 11 is truly horizontal. This position will be attained when the indicating needle 23 is aligned with the zero line of the zeroing scale 24. The standard weights (not shown) are then removed from the powder dish 51 and a suitable amount of gun powder can be placed in the hopper 58.

Figure 1:
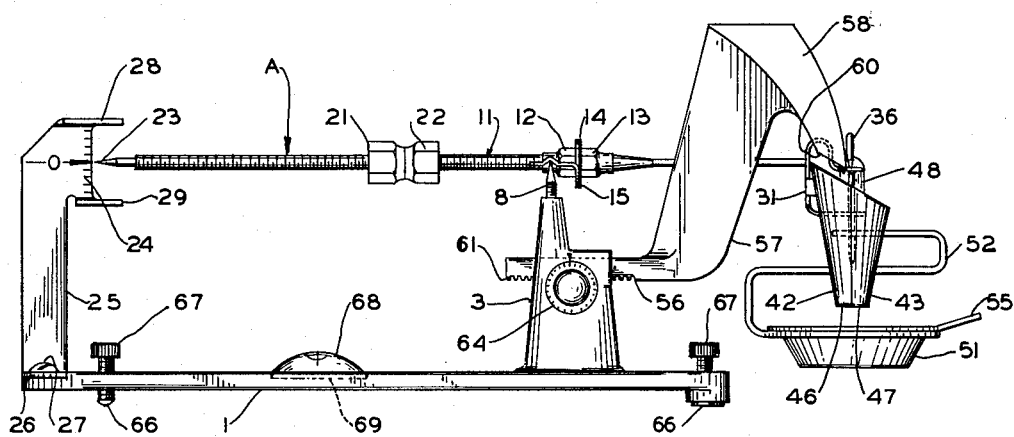
FIG. 1 is a side elevational view of the weighing device constructed in accordance with and embodying the present invention.

For purposes of describing the operation of the weighing device A, it may be assumed that the balancing arm 11 is perfectly weighted with the powder dish or scale-pan 51 and assumes the position as shown in FIG. 1. In this position, the moment-arm caused by the weights 21, 22, on the balancing arm 11, about the fulcrum arm 14, is equal to the moment-arm formed between the powder dish 51 and the fulcrum axis $x$. In this position, the pivot pin 36 will pivot about the vertical pivot axis $y$. Similarly, the funnels 42, 43, carried by the cross-bar 41 will also pivot about the vertical pivot axis $y$ when the balancing arm 11 assumes the position as shown in FIG.

1. In this connection, it should be noted that the weight distributed on the balancing arm 11 and cross-bar 41 is symmetrical about the axis y.

When the moment-arm caused by the weights 21, 22, of the balancing arm 11 is greater than the moment-arm of the powder dish 51, the balancing arm 11 will swing downwardly so that the indicating needle 23 rests upon the abutment plate 29. When this occurs, the bracket 31 will swing rearwardly to the position as shown in FIGS. 9 and 10 and the forward margin of the slot 35 will engage the shank 36' of the pivot pin 36, and thus cause the pin 36 to tilt slightly from the vertical to the position as shown in FIG. 9. As the force which urges the pivot pin 36 rearwardly is directed at the shank 36', which is, of course, displaced from the pivot axis y, the pivot pin 36 will pivot about the pivot axis y, in turn, causing the cross-bar 41 to rotate therewith. As this occurs, the funnel 43 will be rotated immediately beneath the discharge aperture 60 of the hopper 58, and in the "feeding" position.

The gun powder in the hopper 58 will pass through the funnel 43 and out of the discharge aperture 47 thereof and into the powder dish 51. As the powder accumulates within the powder dish 51, the rearward moment-arm about the fulcrum arm 14 will become greater than the forward moment-arm about the fulcrum arm 14 causing the rearward end of the balancing arm 11 to swing downwardly. As the rearward end of the balancing arm 11 swings downwardly, the bracket 31 carried therewith will move forwardly with respect to its last position. The rearward margin of the slot 35 will thereupon engage the shank 36', urging the pivot pin 36 in a forwardly direction. Again, it is to be noted that this force is directed upon the shank 36' which is displaced from the pivot axis y and will, therefore, cause the pin 36 to pivot about the vertical pivot axis y as shown in FIGS. 7 and 8. As the pin 36 rotates about the pivot axis y, the cross-bar 41 will assume the position shown in FIG. 8 and the diverting funnel 42 will move into position immediately beneath the discharge aperture 60 of the hopper 58. Accordingly, the gun powder will no longer flow through the delivery funnel 43 into the powder dish 51, but through the diverting funnel 42. Ordinarily, a suitable pan (not shown) may be disposed beneath the diverting funnel 42 for collecting the powder when it passes out of the discharge aperture 46 thereof.

It can be seen that as soon as a sufficient amount of gun powder has accumulated within the powder dish 51, this increased weight will cause the balancing arm 11 to pivot about the fulcrum arm 14, thereby shifting the position of the pivot pin 36. This will immediately cause the cross-bar 41 to rotate so that the intake aperture 44 is disposed beneath the discharge aperture 60. In effect, this changing of positions of the funnels 42, 43, is almost instantaneous. After the allotted amount of weight of gun powder has accumulated within the powder dish 51, the dish 51 can be removed from the pivot pin 36 merely by lifting the support arm 52 off of the chisel point 40. The gun powder can then be conveniently put into a firearm cartridge (not shown), and the outer dish 51 replaced upon the pin 36 by locating the groove 54 on the chisel point 40. It is to be noted that the dish 51 will always remain disposed beneath the discharge aperture 47 of the funnel 43, and will not rotate because of the chisel point construction.

It may be desirable to adjust the longitudinal position of the hopper 58 over each of the intake apertures 44, 45. Because of the particle size and shape, it may be desired to locate the discharge aperture 60 immediately above the intake aperture 45 and adjacent to the cross-bar 41. For other types of particle size, it may be desirable to locate the discharge aperture 60 above the intake aperture 45 at some position spaced from the cross-bar 41. This longitudinal shifting adjustment can be maintained by actuation of the pinion gear 62 in the manner as previously described.

It is possible to provide a modified form of weighing device B as illustrated in FIGS. 11–15 and which is substantially similar to the previously described weighing device A, except for the balancing mechanism. The weighing device B comprises a base 70 having a pair of integrally formed spaced uprights 71, 72, which are substantially identical with the previously described base 1 and uprights 2, 3, respectively. Mounted within the upper end of the uprights 71, 72, are fulcrum pins 73, 74, for rockably supporting a fulcrum arm 75 which is identical to the previously described fulcrum arm 14 except that the fulcrum arm 75 is provided with a U-shaped bight portion p for securing a balancing arm 76 by means of bolts 77. The balancing arm 76 is provided with a relatively flat surface 78, the latter being imprinted with a scale 79 graduated in suitable units. The upper edge of the balancing arm 76 is longitudinally notched for accommodating a movable slider-weight 80. The slider-weight 80 is provided with a downwardly extending finger 81 which engages any of a plurality of notches of the balancing arm 76. By means of the above-outlined construction, it is possible to set a predetermined weight on the balancing arm 76 by adjusting the longitudinal position of the slider-weight 80.

The balancing arm 76 includes a rearwardly extending portion 82, reference being made to FIG. 11, also having a relatively flat surface 83, the latter being imprinted with a scale 84 graduated in suitable units. The rearwardly extending portion 82 is provided with a plurality of notches 85 on its upper margin for accommodating a counterbalancing slider 86 of predetermined weight, the latter having a projecting flange 87 for engaging the notches 85. The slider 86 is also provided with an upwardly extending handle 88 in order to conveniently grasp and shift the slider 86 along the arm 76.

The remainder of the weighing device B is substantially identical with the previously described weighing device A and is used in like manner. However, with the weighing device B it is possible to select a desired weight of gun powder and preset this weight on the balancing arm 76 by use of the slider-weight 80 and the counterbalancing weight 86.

It should be understood that changes and modification in the form, construction, arrangement, and combination of the several parts of the weighing devices may be made and substituted for those herein shown and described without departing from the nature and principle of my invention.

Having thus described my invention, what I claim and desire to secure by Letters Patent is:

1. A device for weighing out a predetermined quantity of fluent solid weighable material, said device comprising base means, upstanding fulcrum means disposed upon said base means, balancing means pivotally mounted on and extending across said fulcrum means on opposite sides thereof for rocking movement about a horizontal axis, counterweight means operatively mounted on one side of said balancing means with respect to the fulcrum means for maintaining a predetermined weight on said balancing means, and aliquoting means mounted on said balancing means on the other side of said fulcrum means with respect to said counterweight means, said aliquoting means including a cross-bar extending transversely across the balancing means and being pivotally mounted thereon for swinging movement about a secondary axis parallel to the aforementioned horizontal axis and also for rotation about an approximately vertical axis, a receptacle supported by the cross-bar and being adapted to receive said weighable material, means operatively associated with the cross-bar for directing the weighable material into said receptacle, and means for stopping the flow of material from said last-named means into the receptacle responsive to rotation of the cross-bar.

2. A device for weighing out a predetermined quantity of fluent solid weighable material according to claim 1, in which the means operatively associated with the cross-bar is a funnel having oppositely directed separate channels.

3. A device for weighing out a predetermined quantity of fluent solid weighable material according to claim 1, in which the means operatively associated with the cross-bar for directing the weighable material into the receptacle is located at one end of the cross-bar in laterally spaced relation to the approximately vertical axis around which the cross-bar rotates and the other end of the cross-bar is provided with a counterweight which is located on the opposite side of said approximately vertical axis.

4. A device for weighing out a predetermined quantity of fluent solid weighable material according to claim 1 and further characterized by fulcrum means comprising a pair of upstanding support members, pivot means rockably secured to the upper end of each of said support members, said pivot means having a pair of bearing elements, one of said bearing elements being adapted to prevent lateral shifting, the other of said bearing elements being adapted to prevent longitudinal shifting, balancing means pivotally mounted on said pivot means.

5. A device for weighing out a predetermined quantity of fluent solid weighable material according to claim 4, in which the means for directing the weighable material into the receptacle includes a directing funnel mounted on the base and a plural-channel funnel carried by the cross-bar, said plural-channel funnel having intake openings located generally beneath the directing funnel and being adapted to swing responsive to rotation of the cross-bar so that only one channel at a time is in receptive position beneath the stationary funnel, thereby weighing a proper amount of material responsive to the predetermined weight maintained on said balancing means.

6. A device for weighing out a predetermined quantity of fluent solid weighable material according to claim 5, in which the directing funnel is adjustably mounted on the base.

7. A device for weighing out a predetermined quantity of fluent solid weighable material according to claim 5, in which one of the channels of the plural-channel funnel discharges into the receptacle and the other channel thereof discharges outside of the receptacle, device comprising base means, a pair of upstanding support members, pivot means rockably secured to the upper end of each of said support members, said pivot means having a pair of bearing elements, one of said bearing elements being adapted to prevent lateral shifting, the other of said bearing elements being adapted to prevent longitudinal shifting, a balancing arm pivotally mounted on said pivot means, weight control means operatively associated with said balancing arm for maintaining a predetermined weight on said balancing means, and aliquoting means mounted on said balancing arm on the other side of said pivot means with respect to said weight control means for weighing a proper amount of material responsive to the weight maintained on said balancing arm.

8. A device for weighing out a predetermined quantity of material, said device comprising base means, a pair of upstanding support members, pivot means rockably secured to the upper end of each of said support members, said pivot means having a pair of bearing elements, one of said bearing elements being adapted to prevent lateral shifting, the other of said bearing elements being adapted to prevent longitudinal shifting, a balancing arm pivotally mounted on said pivot means, weight control means operatively associated with said balancing arm for maintaining a predetermined weight on said balancing means, support means secured to one end of the balancing arm on opposite sides of said pivot means with respect to said weight control means, a pivot pin pivotally secured to said support means and having first and second pivot axes, material retaining means removably secured to said pivot pin, said balancing arm being adapted to pivot about the pivot means responsive to an increase of weight in said material retaining means and causing said pivot pin to shift from its first to second pivot axes, material feeding means for feeding material to said material retaining means, and means operatively associated with said pivot pin to prevent feeding to said material retaining means when said pivot pin shifts from its first to second pivot axes.

9. A device for weighing out a predetermined quantity of material, said device comprising base means, upstanding support means supported on and carried by the base means, a balancing arm rockably supported by said support means, at least one weight shiftably disposed on said balancing arm, a bracket secured to one end of said balancing arm, a pivot pin pivotally supported by said bracket and having first and second pivot axes, material retaining means removably secured to said pivot pin, said balancing arm being adapted to pivot about the pivot means responsive to an increase of weight in said material retaining means and causing said pivot pin to shift from its first to second pivot axes, material feeding means for feeding material to said material retaining means, and means operatively associated with said pivot pin to prevent feeding to said material retaining means when said pivot pin shifts from its first to second pivot axes.

10. A device for weighing out a predetermined quantity of material, said device comprising base means, upstanding support means supported on and carried by the base means, a balancing arm rockably supported by said support means, at least one weight shiftably disposed on said balancing arm, a bracket secured to one end of said balancing arm, a pivot pin having a relatively straight shank portion and upper and lower arcuate bends, said upper arcuate bend having an upper pivot point pivotally supported by said bracket, said lower arcuate bend having a lower pivot point, material retaining means removably secured to said lower pivot point, means operatively associated with said pivot pin for causing said pivot pin to pivot in a first and a second pivot axis, said balancing arm being adapted to pivot about the pivot means responsive to an increase of weight in said material retaining means and causing said pivot pin to shift from its first to second pivot axes, material feeding means for feeding material to said material retaining means, and means operatively associated with said pivot pin to prevent feeding to said material retaining means when said pivot pin shifts from its first to second pivot axes.

11. A device for weighing out a predetermined quantity of material, said device comprising base means, upstanding support means supported on and carried by the base means, a balancing arm rockably supported by said support means, at least one weight shiftably disposed on said balancing arm, a bracket secured to one end of said balancing arm, a pivot pin having a relatively straight shank portion and upper and lower arcuate bends, said upper arcuate bend having an upper pivot point pivotally supported by said bracket, said lower arcuate bend having a lower pivot point, material retaining means removably secured to said lower pivot point, forked means operatively associated with said bracket and movable therewith, said forked means slidably engaging the shank portion for causing said pivot pin to pivot on a first axis when the balancing arm is loaded on one end and causing the pivot pin to pivot on a second axis when the balancing arm is loaded on the other end, said balancing arm being adapted to pivot about the pivot means responsive to an increase of weight in said material retaining means and causing said pivot pin to shift from its first to second pivot axes, material feeding means for feeding material to said material retaining means, and means operatively associated with said pivot pin to prevent feeding to said material retaining means when said pivot pin shifts from its first to second pivot axes.

12. A device for weighing out a predetermined quantity of material, said device comprising base means, upstanding support means supported on and carried by the base means, a balancing arm rockably supported by said support means, at least one weight shiftably disposed on said balancing arm, a bracket secured to one end of said balancing arm, a pivot pin having a relatively straight shank portion and upper and lower arcuate bends, said upper arcuate bend having an upper pivot point pivotally supported by said bracket, said lower arcuate bend having a lower pivot point, material retaining means removably secured to said lower pivot point, forked means operatively associated with said bracket and movable therewith, said forked means engaging the shank portion for causing said pivot pin to pivot on a first axis when the balancing arm is loaded on one end and causing the pivot pin to pivot on a second axis when the balancing arm is loaded on the other end, said balancing arm being adapted to pivot about the pivot means responsive to an increase of weight in said material retaining means and causing said pivot pin to shift from its first to second pivot axes, material feeding means operatively mounted on said base means, material transference means operatively associated with said material feeding means for normally feeding material to said material retaining means when said pivot pin is adapted to pivot on said first pivot axis, and means operatively associated with said pivot pin for disassociating said material transference means from said feeding means when said pivot pin is caused to pivot about its second pivot axis.

13. A device for weighing out a predetermined quantity of material, said device comprising base means, upstanding support means supported on and carried by the base means, a balancing arm rockably supported by said support means, at least one weight shiftably disposed on said balancing arm, a bracket secured to one end of said balancing arm, a pivot pin having a relatively straight shank portion and upper and lower arcuate bends, said upper arcuate bend having an upper pivot point pivotally supported by said bracket, said lower arcuate bend having a lower pivot point, material retaining means removably secured to said lower pivot point, forked means operatively associated with said bracket and movable therewith, said forked means engaging the shank portion for causing said pivot pin to pivot on a first axis when the balancing arm is loaded on one end and causing the pivot pin to pivot on a second axis when the balancing arm is loaded on the other end, said balancing arm being adapted to pivot about the pivot means responsive to an increase of weight in said material retaining means and causing said pivot pin to shift from its first to second pivot axes, material feeding means shiftably mounted on said base means, material transference means operatively associated with said material feeding means for normally feeding material to said material retaining means when said pivot pin is adapted to pivot on said first pivot axis, and means operatively associated with said pivot pin for disassociating said material transference means from said feeding means when said pivot pin is caused to pivot about its second pivot axis.

14. A device for weighing out a predetermined quantity of material, said device comprising base means, upstanding support means supported on an carried by the base means, a balancing arm rockably supported by said support means, at least one weight shiftably disposed on said balancing arm, a bracket secured to one end of said balancing arm, a pivot pin having a relatively straight shank portion and upper and lower arcuate bends, said upper arcuate bend having an upper pivot point pivotally supported by said bracket, said lower arcuate bend having a lower pivot point, material retaining means removably secured to said lower pivot point, forked means operatively associated with said bracket and movable therewith, said forked means engaging the shank portion for causing said pivot pin to pivot on a first axis when the balancing arm is loaded on one end and causing the pivot pin to pivot on a second axis when the balancing arm is loaded on the other end, said balancing arm being adapted to pivot about the pivot means responsive to an increase of weight in said material retaining means and causing said pivot pin to shift from its first to second pivot axes, material feeding means shiftably mounted on said base means, material transference means operatively associated with said material feeding means for normally feeding material to said material retaining means when said pivot pin is adapted to pivot on said first pivot axis, regulating means operatively associated with said material feeding means for adjusting the relatively position of said material feeding means with respect to said material transference means, and means operatively associated with said pivot pin for disassociating said material transference means from said feeding means when said pivot pin is caused to pivot about its second pivot axis.

15. A device for weighing out a predetermined quantity of material, said device comprising base means, upstanding support means supported on an carried by the base means, a balancing arm rockably supported by said support means, at least one weight shiftably disposed on said balancing arm, a bracket secured to one end of said balancing arm, a pivot pin having a relatively straight shank portion and upper and lower arcuate bends, said upper arcuate bend having an upper pivot point pivotally supported by said bracket, said lower arcuate bend having a lower pivot point, material retaining means removably secured to said lower pivot point, forked means operatively associated with said bracket and movable therewith, said forked means slidably engaging the shank portion for causing said pivot pin to pivot on a first axis when the balancing arm is loaded on one end and causing the pivot pin to pivot on a second axis when the balancing arm is loaded on the other end, said balancing arm being adapted to pivot about the pivot means responsive to an increase of weight in said material retaining means and causing said pivot pin to shift from its first to second pivot axes, material feeding means shiftably mounted on said base means, material transference means operatively associated with said material feeding means for normally feeding material to said material retaining means when said pivot pin is adapted to pivot on said first pivot axis, regulating means operatively associated with said material feeding means for adjusting the relative position of said material feeding means with respect to said material transference means, said regulating means including a rack operatively attached to said feeding means, said regulating means also including gear means for actuating said rack, and means operatively associated with said pivot pin for disassociating said material transference means from said feeding means when said pivot pin is caused to pivot about its second pivot axis.

16. A device for weighing out a predetermined quantity of material, said device comprising base means, upstanding support means supported on and carried by the base means, a balancing arm rockably supported by said support means, at least one weight shiftably disposed on said balancing arm, a bracket secured to one end of said balancing arm, a pivot pin having a relatively straight shank portion and upper and lower arcuate bends, said upper arcuate bend having an upper pivot point pivotally supported by said bracket, said lower arcuate bend having a lower pivot point, material retaining means removably secured to said lower pivot point, forked means operatively associated with said bracket and movable therewith, said forked means slidably engaging the shank portion for causing said pivot pin to pivot on a first axis when the balancing arm is loaded on one end and causing the pivot pin to pivot on a second axis when the balancing arm is loaded on the other end, stop means for regulating the degree of pivot of said pivot pin and maintaining said pivot pin in either its first or second pivot axis, said balancing arm being adapted to pivot about the pivot means responsive to an increase of weight in said material retaining means and causing said pivot pin to shift from its first to second pivot axes, material feeding means shiftably mounted on said base means, material transference means operatively associated with said material feeding means for normally feeding material to said material retaining means, when said pivot pin is adapted to pivot on said first pivot axis, and means operatively associated with said pivot pin for disassociating said material transference means from said feeding means when said pivot pin is caused to pivot about its second pivot axis.

References Cited in the file of this patent

UNITED STATES PATENTS

| | | |
|---|---|---|
| 2,861,846 | Webster | Nov. 25, 1958 |
| 3,027,955 | McCown | Apr. 3, 1962 |

FOREIGN PATENTS

| | | |
|---|---|---|
| 69,315 | Germany | June 19, 1893 |
| 697,218 | Great Britain | Sept. 16, 1953 |